SYSTEM-INTERCONNECTING ARRANGEMENT

BACKGROUND OF THE INVENTION

The invention relates to an arrangement for interconnecting a pair of electric power systems.

It is well known that system-interconnecting arrangements are intended to incorporate a pair of electric power systems into a single unit to perform efficient system operation and are required to exhibit the following three functions:

1. The transmission of electric power between the pair of electric system is normally permitted with no obstacle which is called the free flow system-interconnecting function. This function is effective for placing the pair of electric power systems into a strongly interconnected system. To this end, the arrangement is required to have its impedance as low as possible;

2. Upon the occurrence of a short circuit failure on one of the electric power systems, the inrush of a short circuit current from the other or sound system into the short-circuited system should be instantaneously suppressed which is called the fault-current-limiting function. To this end, the arrangement is required to have its impedance as high as possible which, in turn, contradicts the requirement as above-described for the free flow system-interconnecting function; and 3. If one of the electric power systems is short of electric power required for supplying the associated loads (which is said to be unbalanced) the other electric system must apply a proper quantity of electric power to the system to relieve the unbalanced system. In that event if the other or sound system applies an excessive quantity of electric power to the unbalanced system the former previously sound system may become short of its required electric power resulting in a fear that power in both the electric systems will fall together. To avoid such power-falling failure together, it is required to regulate the relief power to a proper quantity which is called the relief-power-regulating function.

In order to exhibit the functions as above-described, it has been previously the practice to interpose a series transformer between a pair of electric power systems having a variable impedance device connected to the secondary winding thereof. The functions (1), (2) and (3) of the arrangement as above-described can be effectively exhibited only with the variable-impedance device meeting the following requirements:

I. As above-described, the system-interconnecting arrangements are required to be normally low in impedance. If the impedance of the series transformer is decreased below a certain magnitude then the transformer becomes very expensive and also difficult to be designed. This inhibits the series transformer from decreasing in impedance below a certain magnitude. This leads to the requirement that the variable impedance device have normally a capacitive impedance for the purpose of compensating for the impedance of the series transformer thereby to decrease the impedance of the arrangement;

II. Immediately after a short circuit failure has occurred on either one of both the electric systems, the interconnecting arrangement must increase in interconnecting impedance instantaneously after its occurrence, for example, within one cycle of the system current. This leads to the requirement that the variable impedance device be instantaneously changed from the capacitive to the inductive impedance; and III. Upon regulating the relief power, the interconnecting impedance of the arrangement is required to have a proper magnitude in accordance with the particular stream of the electric power flowing therethrough. This leads to the requirement that the variable-impedance device vary in response to a change in stream of electric power flowing therethrough.

SUMMARY OF THE INVENTION

Accordingly it is an object of the invention to put always a pair of electric power systems in smooth interconnected system operation.

It is another object of the invention to provide a new and improved system-interconnecting assembly formed of a plurality of system-interconnecting arrangements connected in parallel circuit relationship to increase reliability.

It is still another object of the invention to provide a system-interconnecting arrangement of the type as described in the preceding paragraph having a circuit breaker connected in series or parallel circuit relationship between both the electric power systems for operating them together or independently whenever it is desired to do so.

The invention accomplishes these objects by the provision of an arrangement for interconnecting a pair of electric power systems, comprising a series transformer connected between the electric power systems and having operatively coupled to a capacitor and switch means, characterized by a shunt transformer including a primary winding, a secondary winding and a tertiary winding, the primary and secondary windings connected in parallel circuit relationship to the secondary winding of the series transformer, the capacitor being connected to the secondary winding of the shunt transformer, and the switch means being connected across the tertiary winding of the shunt transformer.

Preferably the series transformer may have a circuit interrupter connected thereacross.

BRIEF DESCRIPTION OF THE DRAWING

The invention will become more readily apparent from the following detailed description taken in conjunction with the accompanying drawing in which.

DESCRIPTION OF THE PREFERRED EMBODIMENT

Figure 1:
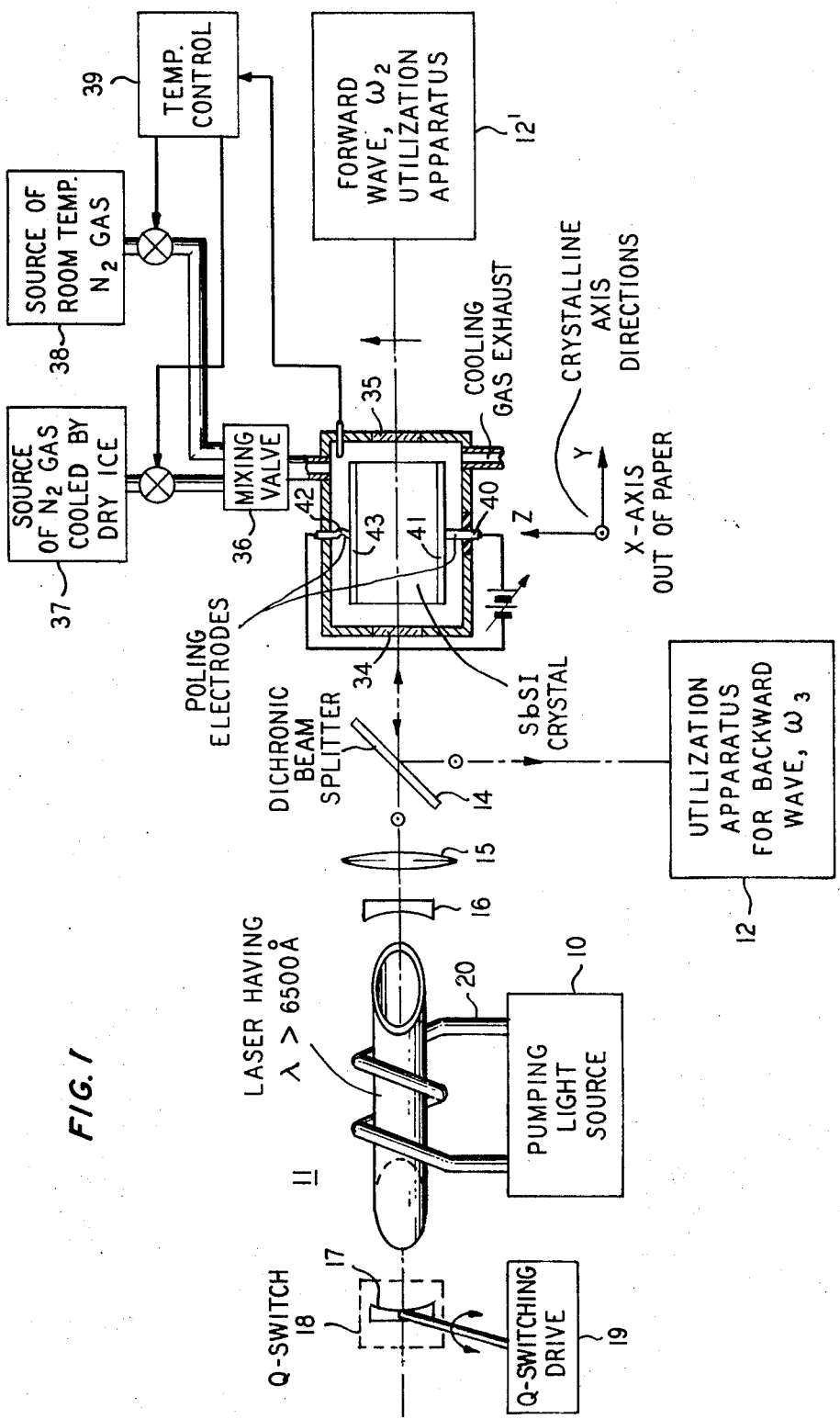
FIGS. 1a, b, c, and d are schematic circuit diagrams of system-interconnecting arrangements based upon the principles of the prior art.

Referring now to FIG. 1 of the drawings there are illustrated various forms of system-interconnecting arrangements based upon the principles of the prior art. A pair of electric power systems schematically designated by the reference characters A and B have connected there between a series transformer T. More specifically, the series transformer T includes a primary winding connected between the electric power systems A and B and a secondary winding having connected thereacross a semiconductor switch shown here as being thyristor S (See FIG. 1a), a series combination of a capacitor C and a switch or a thyristor S (see FIG. 1b), a parallel combination of a current limiting reactor L and a thyristor S (see FIG. 1c), or a series combination of a capacitor C and a thyristor $S_1$ connected across another series combination of a current-limiting reactor L and another thyristor $S_2$ (see FIG. 1d).

In FIG. 1a, the switch or thyristor S is normally in its closed position to interconnect the electrical power systems A and B through the leakage impedance of the series transformer T. Upon the occurrence of a short circuit failure on either one of the electric systems A or B, the thyristor S is brought into its open position to interconnect both the systems through the excitation impedance of the series transformer. This is true in the case of the relief-power regulation.

From FIG. 1a it will be seen that the impedance of the series transformer T in the normal interconnected system operation is set as a part of the above-mentioned requirement (I) and therefore it becomes high. Alternatively a decrease in impedance results in unduly high costs of the series transformer. Further the series transformer has a very high impedance appearing under the relief-power regulation and also an impedance much changed from the impedance during the normal interconnected system operation. This causes transient stability of both systems to be adversely affected. In

PATENTED OCT 5 1971 3,610,945

SHEET 2 OF 3

OPTICAL BACKWARD-WAVE OSCILLATOR EMPLOYING SOSCSI AND PROCESS FOR MAKING CRYSTAL

BACKGROUND OF THE INVENTION

This invention relates to backward-wave parametric oscillators, particularly those employing an unguided interaction in a bulk nonlinear medium, and to a process for growing a crystal suitable for such oscillators.

Backward-wave parametric oscillators have been proposed for operation in the infrared portion of the electromagnetic spectrum. An example of such a proposal is the article by Mr. S. E. Harris, "Proposed Backward Wave Oscillation in the Infrared," Applied Physics Letters, 9, 114 Aug. 1, 1966 in which the use of trigonal selenium is proposed because of its high fractional birefringence.

Nevertheless, selenium presents substantial problems of double refraction if the crystal is oriented to obtain a phase-matched interaction. Double refraction separates the propagating waves and limits their interaction. As is well known, double refraction can be avoided in an unguided interaction only by collinear propagation of the phase-matched waves along a principal axis. In a uniaxial crystal, such directions that permit phase matching are normal to the optic axis. In selenium, such a direction of propagation causes the nonlinear effect to be zero. Thus, in using selenium for a backward-wave oscillator, one is caught on the horns of the dilemma that either the interaction will be weak because double refraction separates the waves or the interaction will be nonexistent because the nonlinear effect is zero.

Clearly, a better material for a backward-wave parametric oscillator is needed.

SUMMARY OF THE INVENTION

We have recognized that the foregoing problems can be overcome and a strong nonlinear interaction provided without double refraction by employing a single crystal of high-resistivity antimony sulphur iodide (SbSI). The uniqueness of SbSI derives in part from its very large fractional birefringence. The refractive indices are approximately $n_c=3.56$, $n_b=3.00$, $n_a=2.55$ corresponding to the electric vector parallel to the $c$, $b$ or $a$ crystal axis. A rectangular coordinate system along the rectangular $a$, $b$, $c$, axes is labeled X, Y, X, respectively.

SbSI is a crystal of red appearance and has its band gap in the red at a wavelength of about 6,500° A. It is noteworthy for its very broad frequency band of substantial transparency, extending from frequencies in the red portion of the visible spectrum down through the infrared to greater than 14 microns. This broadband of transparency makes it ideal for backward-wave oscillators and also makes it possible to pump the crystal with the most powerful solid-state lasers, including neodymium-ion (yttrium aluminum garnet host) and ruby lasers.

The crystal is oriented to provide a phase-matched nonlinear parametric interaction parallel to a principal axis and in this case either the Y ($b$) or X ($a$) axis, but preferably the former. Operation along the X-axis will result in the lowest frequency of operation but a higher threshold. Advantageously, the nonlinear coefficient is very large for collinear propagation in the Y-direction parallel to a principal axis and is substantial for all other directions in the XY plane.

Advantageously, a backward-wave oscillator according to our invention is tunable because of the unusual property of an SbSI crystal that it experiences a phase transition near room temperature. Variation of the operating temperature of the crystal from room temperature produces a strong variation of the phase-matching condition and, consequently, of the frequencies of the generated waves. Moreover, since SbSI is a ferroelectric crystal, this temperature tuning is advantageously used in conjunction with fine tuning provided by a variable electric field applied through electrodes that are required to pole the crystal to form it into a single domain.

According to another feature of the invention, the crystal is grown in a way that counteracts its needle-forming growth-rate anisotropy.

BRIEF DESCRIPTION OF THE DRAWING

Figure 2:
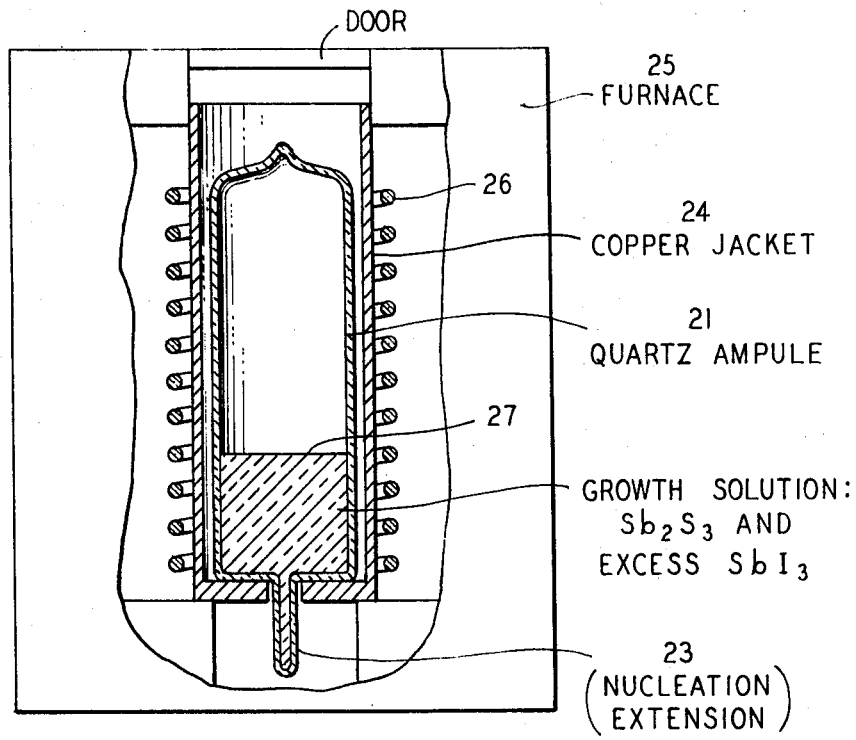
FIG. 2 is a schematic circuit diagram useful in explaining the principles of the invention.
Figure 3:
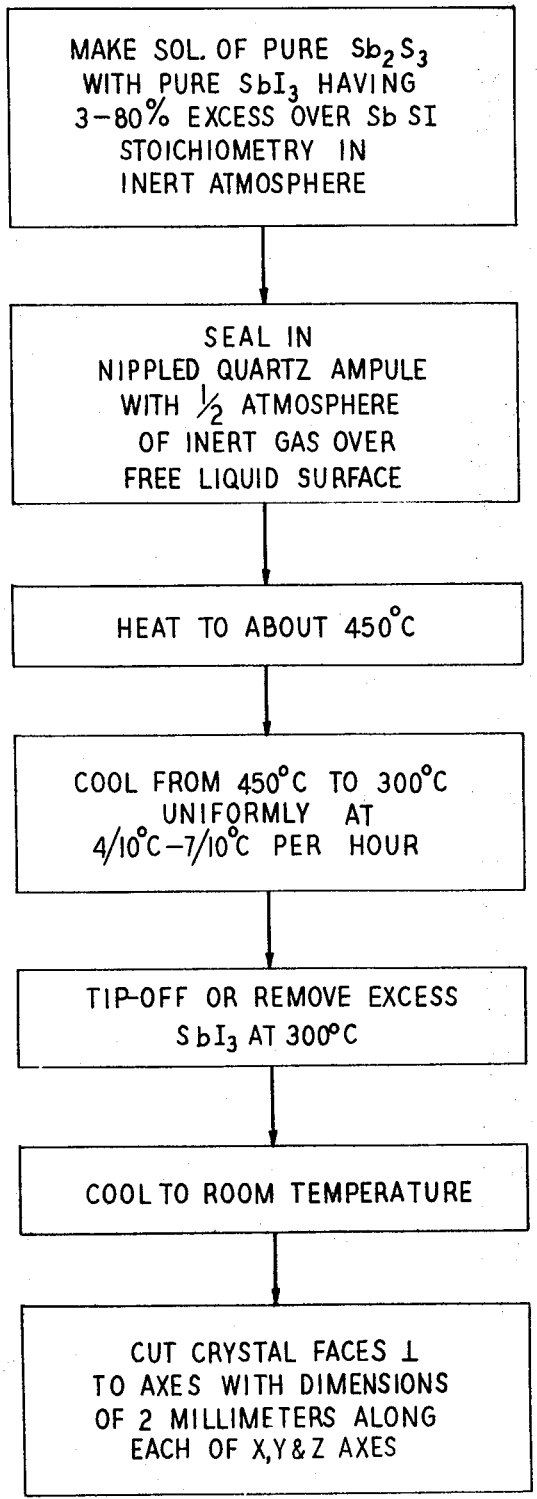
FIG. 3 is a circuit diagram of a system-interconnecting arrangement constructed in accordance with the principles of the invention.

Further features and advantages of our invention will become apparent from the following detailed description, taken together with the drawing, in which:

FIG. 1 is a partially pictorial and partially block diagrammatic illustration of a preferred embodiment of the invention;

FIG. 2 is a pictorial illustration of an apparatus used in growing the SbSI crystal;

FIG. 3 is a flow chart of a preferred method for making the crystal; and

Figure 4:
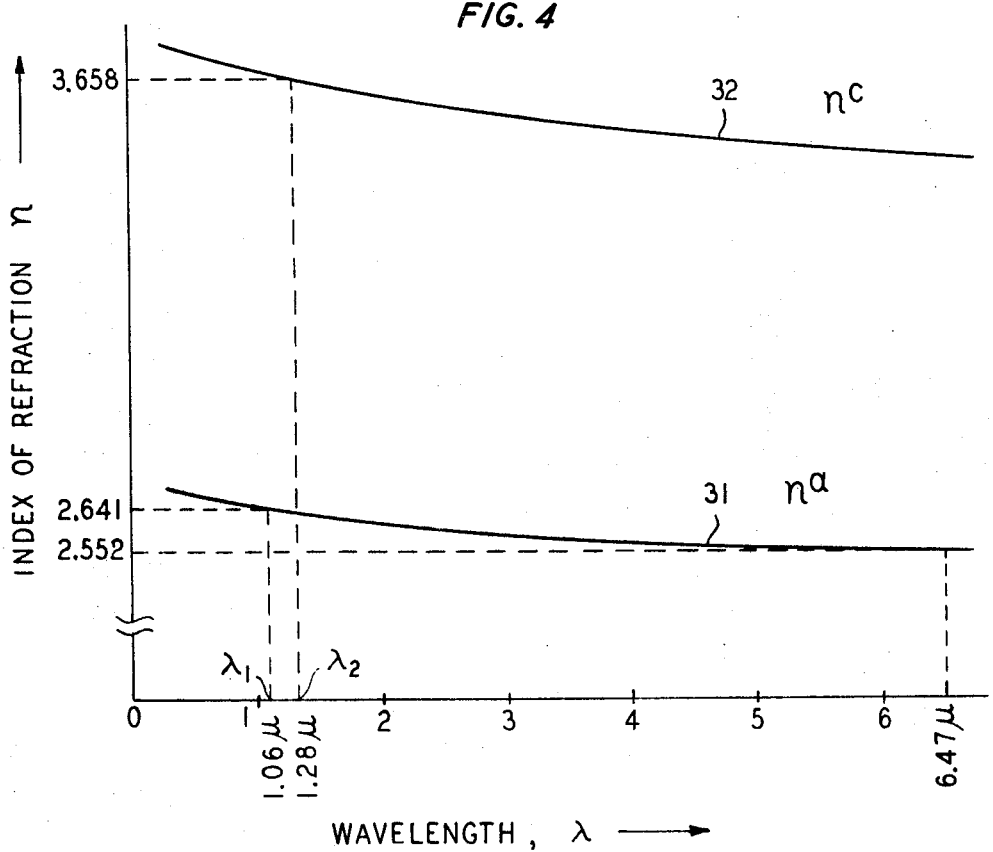

FIG. 4 shows curves which are useful in explaining the theory and operation of the invention.

DESCRIPTION OF ILLUSTRATIVE EMBODIMENT

In the preferred embodiment of FIG. 1, the advantageous structural simplicity of a backward-wave infrared parametric oscillator should be quite apparent. Given coherent pumping radiation at one infrared wavelength, for example, at $1.06\mu$, as obtained from a neodymium-ion laser source 11 employing neodymium ions in an yttrium aluminum garnet host, it is desired to produce coherent radiation at longer wavelengths. To this end, backward-wave oscillation is provided in an SbSI crystal 13 without the aid of an optical resonator. Oscillation without an optical resonator is one of the principal attractions of an infrared backward-wave parametric oscillator.

The presence of a resonator would reduce the parametric oscillation threshold, but then one might as well use forward-wave phase-matching. A backward-wave phase-matched interaction provides feedback without external resonators.

Between laser source 11 and crystal 13, there is disposed a dichroic reflector 14 which is substantially transparent to the 1.06-micron pumping radiation but is highly reflective for the backward-wave radiation at a substantially longer wavelength. Reflector 14 is oriented obliquely to the oscillator axis to direct the backward-wave radiation laterally into utilization apparatus 12.

SbSI crystal 13 is disposed in a temperature-controlled enclosure 33 with suitable transparent, antireflection-coated barium fluoride ($BaF_2$) windows 34 and 35.

Nitrogen gas at a temperature at which it is desired to maintain crystal 13 is flowed past crystal 13 from a mixing valve 36 coupled to sources 37 and 38 of nitrogen gas at the temperature of solidified carbon dioxide at atmospheric pressure and room temperature, respectively. The relative flows from sources 37 and 38 are controlled manually or by a suitable temperature control 39. Control 39 may be a typical servomechanism responsive to the temperature of crystal 13 or to the frequency of the generated forward wave detected at apparatus 12' or the frequency of the generated backward wave detected at apparatus 12.

Crystal 13 is supported in enclosure 33 by a stiff electrode 40 and area contact 41 by a flexible electrode 42 and area contact 43. These same electrodes and contacts are used for poling the crystal after it has been cooled through the Curie point. The electrical ohmic contact is difficult to make and the literature suggests gold-evaporated contacts or aquadag (carbon black). These are both mechanically weak. We have found a superior solder to make a good ohmic bond to be liquid alloy solder Viking®LS 232 (contains Tl, Hg, In) manufactured by Dumas.

Electrodes 40 and 42 illustratively connect crystal 13 across a source 44 of variable electrical voltage for the purposes of poling the crystal into a single domain and for fine tuning of the refractive index and thus the phase-matching condition.

Crystal 13 may be grown as a sufficiently large single crystal so that it may be cut to final dimensions of 2 millimeters along each edge of the cube, with faces orthogonal to its X, Y and Z crystalline axes. Alternatively, Brewster-angle, or antireflection-coated input and output faces, or an input face oriented to refract the input beam along the Y direction can be used. Two growth techniques are described hereinafter. The crystal 13 should be of good optical transparency and high resistivity such that free carrier absorption and other losses are negligible at all three frequencies. Crystal 13 is oriented with its Y-axis (a principal axis) along the direction of propagation of pumping radiation from source 11, with the Z-axis normal to the polarization of the pumping radiation.

The surfaces of crystal 13 orthogonal to the Y-axis are polished to reduce scattering losses. While these surfaces will cause some portions of pumping and generated waves to be multiply reflected, they do not provide a high-Q resonator. Moreover, an optical resonator is unnecessary.

Laser source 11 is of the type disclosed in U.S. PAT. NO. 3,252,103 to J. E. Geusic and L. G. G. Van Uitert, issued May 17, 1966, illustratively producing a repetitively pulsed peak power output of 1,000 watts at 1.06 microns focused to a waist of $1\times10^{14}$ square millimeters at the center of crystal 13. The laser is repetitively Q-switched by one of a variety of conventional means, i.e., a Q-switch 18 such as a rotating mirror 17, pulsed pumping lamp or acoustic mirror. In the former illustrative case, Q-switch 18 is driven by a Q-switching drive 19, such as a servomotor that rotates mirror 17. The focusing apparatus 15 is included in laser source 11 just beyond the partially transmissive end mirror 16 of the laser.

Utilization apparatus 12 may illustratively be an optical modulator, such as a tellurium optical modulator of the type disclosed in U.S. Pat. No. 3,414,728 to C. K. N. Patel, issued Dec. 3, 1968. In such a modulator, the radiation from crystal 13 becomes the carrier-wave and is modulated with a lower frequency signal. Apparatus 12 could also be any other apparatus which can use radiation at the frequency of a frequency-shifted output radiation from crystal 13. Optionally, a second utilization apparatus 12' can receive the forward-propagating idler wave which is generated in crystal 13.

Dichroic reflector 14 may be made by techniques well known in the optical arts to have the high transmissivity for the pumping radiation and high reflectivity for the backward-wave radiation at a substantially longer wavelength. Typically, multiple layers of dielectric materials are selected with appropriate refractive indices and thicknesses for this purpose.

In the operation of the embodiment of FIG. 1, the pumping radiation, polarized along the X-axis induces a forward-propagating radiation, polarized along the Z-axis and a backward-wave radiation, which is polarized along the X-axis and propagates collinearly with respect to the pumping and forward-wave radiation along the Y(010) axis.

The forward-wave radiations are induced because of the nonlinear properties of crystal 13 and occur at frequencies at which they are phase-matched to the pumping radiation, for the particular temperature and electric field to which crystal 13 is subjected.

While complete refractive index data for SbSI does not exist in the literature, our investigations indicate that the most complete and reliable data in the infrared is found in the article by R. Johannes and W. Haas, Applied Optics, 6, 1,05 (1967). From such data, we suggest collinear phase-matched operation with propagation in the Y-axis direction (010 or $b$ axis) at free-space wavelengths $\lambda_2=1.28\mu$ and $\lambda_2=6.47\mu$, assuming that the pump wavelength $\lambda_3=1.06\mu$. We suggest, for this purpose, an operating temperature of about 5° C., within a few degrees, in the absence of an electric field. Naturally, this operating temperature is below the Curie temperature, which is about 20° C. (approximately room temperature). Above the Curie temperature the optical nonlinearities of which we speak disappear.

The frequencies of the phase-matched radiations can be adjusted by temperature tuning of the crystal or by rotation of the crystal about the Z-axis both of which change the relative values of the pertinent refractive indices. If propagation in the X-axis direction (also a principal axis) were chosen a different pair of wavelengths would be phase matched such that, in general, $\lambda_1$ would increase and $\lambda_2$ would decrease. In other words, the forward-wave frequency would vary toward the pump frequency. Electro-optic tuning of the phase-matching condition is capable of producing relatively smaller changes in the generated wavelengths than the temperature tuning.

A mathematical analysis of the operation is as follows. Below 20° C., SbSI is of point group mm2 and it is well known that the nonlinear symmetry properties are of the same form as the piezoelectric symmetry properties. Consequently, the induced nonlinear polarization waves at the forward and backward frequencies are as follows (in mks units):

$$P_{2Z}=2\epsilon_0 d_{31}E_{3X}E_{1X} \quad (1)$$

and $$P_{1X}=2\epsilon_0 d_{15}E_{3X}E_{2Z}, \quad (2)$$

where the subscripts 3, 2 and 1 of the $P$'s and $E$'s designate pump, forward wave and backward wave, respectively, and the second subscript designates the axis along which that electric field is polarized. In the case of the $P$'s, the electric field properties associated with the polarization wave are also designated by the same subscripts.

The D. A. Kleinman symmetry condition is that, neglecting dispersion, $d_{31}=d_{15}$, a condition that we expect to be approximately true in this case. See Physical Review, 126, 1977 June 15, 1962).

The conservation of energy relationship, or frequency relationship, is as follow:

$$\omega_3=\omega_2+\omega_1, \quad (3)$$

where angular frequency $\omega=2\Pi\nu=2\Pi c/\lambda$, in general $c$ being the velocity of light, $\nu$ the frequency in Hertz, and $\lambda$ the free space wavelength.

The phase-matching relationship, which provides continuous transfer of energy from the pumping radiation to the signal and idler radiations, is written in exact form as follows:

$$k_3=k_2-k_1 \quad (4)$$

where the minus sign is used because $\omega_1$ propagates in the backward direction, and the $k$'s are propagation vectors.

Because the propagation of all three waves is collinear, equation (5) may be written in terms of scalar quantities as follows:

$$n_3\nu_3=n_2\nu_2-n_1\nu_1 \quad (5)$$

where $\mu_3$, $\nu_2$ and $\nu_1$ are the pump, idler and signal frequencies in Hertz, and $n_3$, $n_2$ and $n_1$ are the respective applicable indices of refraction and are evaluated from dispersion curves such as curves 31 and 32 in FIG. 4.

Our calculations yield a threshold for backward-wave oscillation, without external reflectors, of 10 watts of pumping power for e.g., crystal approximately 2 millimeters in length. This assumes an approximate value of $d_{15}=d_{31}\approx1\times10^{-19}$ meters/volt. Operation at a pumping power of 100 watts gives a sufficient margin over threshold for efficient backward-wave oscillation at an output power level which is perhaps as large as 90 watts.

The threshold depends on the product ($d_{15}d_{31}$) and thus if each one of these, e.g., $d_{15}$ is reduced by 10 from what we estimate, then the threshold will be 100 times higher. Furthermore, approximate optimum focusing of the pump is assumed, which will be approximately described by the copending patent application of one of us, G.D. Boyd, with D. A. Kleinman, Ser. No. 712,055, filed Mar. 14, 1968 now U.S. Pat. No. 3,530,301.

It is reiterated that backward-wave oscillation could also be achieved by rotating crystal 13 about its Z-axis so that a collinear phase match is obtained along another principal axis, such as the X-direction, still without double refraction. In that case, as indicated above, the difference between the forward and backward frequencies will be greater than for the lowest threshold case, all other conditions being equal.

The temperature tuning differs from that disclosed in U.S. Pat. No. 3,328,723, to Messrs. J. A. Giordmaine and R. C. Miller, issued June 27, 1967, in that a dramatic accentuation of its effect is derived from the nearness of the SbSI phase transition to room temperature.

It may be desirable in view of the optional temperature tuning and in view of the substantial heat generated by continuous operation to provide substantial cooling capacity in the cooling apparatus for crystal 13, since it will be in general desirable to operate at temperatures below 20° C. If the Curie temperature is inadvertently passed and the phase transition occurs, then the crystal must be repoled upon cooling.

While the preferred embodiment employs a collinear phase match and no double refraction, it should be understood that modest departures from both colinearity and a mean direction along a principal axis are readily tolerated. For example, such deviations would permit further angular tuning of the backward-wave oscillation frequencies.

According to another modification, one could provide an external optical resonator about crystal 13, the resonator being narrowly tuned to the backward wave (or, alternatively, the induced forward wave). A spectrum of closely spaced backward-wave frequencies at the axial modes of the resonator would be obtained. Advantageously, these backward-wave modes could be amplitude and phase locked by a suitable modulator to obtain a continuous train of sharp pulses of center frequency $\omega_3$. The pumping would still be continuous.

Crystals of SbSI have heretofore variously been grown from a melt by a Bridgman-type technique, from the vapor phase, from solution in excess $SbI_3$, from a water solution, and under hydrothermal conditions. In each case the acicular, or needlelike, growth habit of the crystal leads to a growth velocity some 100 times in the $c$-axis direction than that in an orthogonal direction, thus leading to a needlelike crystal morphology. Despite many attempts according to such techniques in various experiments, crystals larger than 3 mm. in diameter could not be obtained.

In the following technique, nucleation is achieved in a high-temperature gradient in a narrow appendage to the growth vessel; and growth proceeds from there into a temperature-gradient-free growth vessel in which new nucleation cannot occur and in which, significantly, a liquid surface constrains the few crystals growing into this region to grow sideways. Basically, the shape of the liquid body controls the growth of the crystals.

More specifically, the crystal 13 is made by the following technique.

The technique involves uniform cooling of a conventional melt or liquid solution in a sealed ampule which has a narrow nipple in which cooling starts. A diagram of this apparatus is shown in FIG. 2.

The furnace 25 includes a heating coil 26 and a copper jacket 24, one-sixteenth inch thick, which helps to maintain a uniform temperature over most of the quartz ampule 21 of 1 millimeter wall thickness.

The nipple portion 23 is about 38 millimeters to 50 millimeters long; and its inside diameter is no greater than 4 millimeters and is as straight as possible. The inside diameter can be smaller if nipple 23 can be made sufficiently straight inside. The wall thickness of nipple 23 is preferably less than that of the remainder of ampule 21. It may be seen that the internal aspect ratio (length divided by diameter) is about 10:1 or greater.

Naturally, when cooling is started, the nipple portion 23 which protrudes through a hole in the copper jacket 24 starts to cool first; and the crystals nucleate there and grow from this end, with the $c$ axis along the direction of elongation of nipple 23. The temperature gradient in the nipple can be 20 ° C. per centimeter to 200° C. per centimeter; but the gradient is preferably 50°–100° C. per centimeter. The orientation of the $a$ and $b$ axes is not considered critical but might be influenced by laterally asymmetrical nucleation conditions in nipple 23.

The larger portion of the ampule is 25 mm. in diameter and 70 mm. long. There is essentially no temperature gradient (less than 10° C. per centimeter) in this region so that further nucleation does not occur. Nevertheless, it is preferred that the temperature gradient in this region be less than 1° C., per centimeter.

The initial melt or liquid solution includes illustratively highly pure $Sb_2S_3$ and $SbI_3$. In the presently preferred flux-type (liquid solution) process, the latter material is present in a 3 to 80 percent molar excess over the stoichiometric proportions for SbSI to act as a solvent. Nevertheless, a melt (stoichiometric) process can also be employed according to this feature of the invention. The free liquid surface will still provide lateral growth to counteract needle formation. These materials are introduced into the ampule 21 under clean conditions in one-half atmosphere of inert gas, such as nitrogen, at room temperature, which preserves the free liquid surface and tends to prevent growth of the crystal from vapor in the atmosphere. The ampule is then sealed, inserted into the furnace and heated to about 450° C.

The furnace is then cooled from about 450° C. to about 300° C., uniformly at from 4/10° C. to 7/10° C. per hour. More broadly, it could be 0.1° C. to 1° C. per hour. Cooling rates less than 0.1° C. per hour appear to be of lesser practical interest.

The few single crystals nucleated in nipple 23 grow in their typical needlelike form, typically with a 100:1 growth ratio until they encounter the liquid surface 27, above which the inert nitrogen atmosphere inhibits growth from the vapor phase. Whether in a flux process (liquid solution), as described, or in a melt process (stoichiometric proportions), the growth is purely liquid-solid growth. After encountering liquid surface 27, the few single crystals must grow sideways, preferably until constrained by a liquid surface at a remote sidewall of ampule 21 or by another of the crystals originally nucleated in nipple 23 or until growth is terminated. To sustain the sideways growth, a saturated solution of SbSI continues to exist at the lateral liquid-solid interface. Lateral growth ceases when saturation ceases to exist at the interface. At about 300° C. in the flux process, the excess $SbI_3$ is "-tipped," poured away from the ingot, or is otherwise removed. The ingot is then cooled to room temperature at any desired rate; the ampule is broken; and the ingot is removed.

The resultant ingot is made up of a few single crystals, from which usable sections up to a few millimeters in all directions can be cut.

One variant of the foregoing process would provide the liquid surface 27 at a desired distance from nipple 23 by shaping the ampule 21 so that its top surface occurs at this distance. The needlelike growth of the single crystals is then inhibited by the liquid surface formed at its interface with a glassy or solid surface. No inert atmosphere is needed. The crystals then grow sideways, until they meet the remote sidewalls of ampule 21, or until growth is terminated. No new nucleation of crystals is permitted to occur outside nipple 23.

While the foregoing variant process is usable with either flux or melt processes, it is well adapted for use with a melt process, since there is no need to remove the excess material ($SbI_3$) employed as the solvent in the flux process and crystal growth continues until the complete contents of the ampule are crystallized.

It is anticipated that our technique could also be applied to growth from a single seed crystal, in which case one single crystal would be obtained as the product. Such a modified technique appears to provide a promising way to control the orientation of $a$ and $b$ axes in the final crystal. The seed crystal would be oriented with its $c$ axis orthogonal to liquid surface 27.

It may be noted also that, in some instances of the growth of SbSI crystals, nipple 23 had a small enlargement (up to 7 millimeters internal diameter) at its lower extremity.

If desired for particular applications, selected dopant impurities can be introduced in the starting mixture.

We claim:

1. A coherent optical backward-wave oscillator of the type in which a substantially transparent body of material having a substantial second order nonlinear coefficient and birefringence sufficiently large to permit polarization-dependent phase-matching of two forward and one backward propagating waves is pumped by energy from a coherent optical energy source, said oscillator being characterized in that said body consists essentially of high-resistivity single-crystal SbSI.

2. An oscillator of the type claimed in claim 1 in which the SbSI crystal is oriented to receive the pumping wave from the energy source in a direction substantially along a principal axis, said crystal being cut to have surfaces oriented to facilitate transmission of said wave along said direction.

3. An oscillator of the type claimed in claim 2 in which the SbSI crystal is oriented to receive the pumping wave substantially along its Y crystalline axis, whereby substantially maximum birefringence and nonlinear effects are provided without substantial double refraction.

4. An oscillator of the type claimed in claim 1 including means for tuning the frequencies of the backward-propagating wave and a forward-propagating wave by varying the temperature of the crystal, said tuning means comprising a source of a room temperature gas, a source of gas at a temperature near the temperature of solidified carbon dioxide, and means for flowing a variable mixture of said gases past said crystal to maintain the temperature of said crystal in a range immediately below 20° C.

UNITED STATES PATENT OFFICE
CERTIFICATE OF CORRECTION

Patent No. 3,610,945                     Dated  October 5, 1971

Inventor(s) Gary D. Boyd, S. K. Kurtz and Kurt Nassau

It is certified that error appears in the above-identified patent and that said Letters Patent are hereby corrected as shown below:

In two instances in the title, both on the covering page and in column 1, change "SOSCSI" to --SbSI--.

Signed and sealed this 7th day of March 1972.

(SEAL)
Attest:

EDWARD M. FLETCHER, JR.        ROBERT GOTTSCHALK
Attesting Officer              Commissioner of Patents